US012715143B2

(12) United States Patent
Konno et al.

(10) Patent No.: US 12,715,143 B2
(45) Date of Patent: Aug. 25, 2026

(54) PAINTING ROBOT AND PAINTING SYSTEM

(71) Applicant: KABUSHIKI KAISHA YASKAWA DENKI, Fukuoka (JP)

(72) Inventors: Tsuyoshi Konno, Fukuoka (JP); Makoto Tabata, Fukuoka (JP); Yuta Matsuda, Fukuoka (JP)

(73) Assignee: KABUSHIKI KAISHA YASKAWA DENKI, Fukuoka (JP)

(*) Notice: Subject to any disclaimer, the term of this patent is extended or adjusted under 35 U.S.C. 154(b) by 675 days.

(21) Appl. No.: 18/189,743

(22) Filed: Mar. 24, 2023

(65) Prior Publication Data

US 2023/0311333 A1 Oct. 5, 2023

(30) Foreign Application Priority Data

Mar. 31, 2022 (JP) ................................ 2022-059168

(51) Int. Cl.

| | |
|---|---|
| ***B25J 11/00*** | (2006.01) |
| ***B05B 13/04*** | (2006.01) |
| ***B25J 9/00*** | (2006.01) |
| ***B25J 9/04*** | (2006.01) |
| ***B25J 9/14*** | (2006.01) |
| ***B25J 19/00*** | (2006.01) |

(52) U.S. Cl.

CPC ....... *B25J 11/0075* (2013.01); *B05B 13/0431* (2013.01); *B25J 9/0009* (2013.01); *B25J 9/045* (2013.01); *B25J 9/14* (2013.01); *B25J 19/0025* (2013.01)

(58) Field of Classification Search

USPC ........................ 118/321, 323, 326, 309, 634

See application file for complete search history.

(56) References Cited

U.S. PATENT DOCUMENTS 6,328,799 B1 * 12/2001 Inoue .................. B25J 19/0029 118/683
7,622,001 B2 * 11/2009 Inada .................. B25J 19/0029 239/587.5
10,836,042 B2 11/2020 Okahisa et al.

(Continued)

FOREIGN PATENT DOCUMENTS

CN 107051799 A 8/2017
CN 107635730 A 1/2018
CN 207401633 U 5/2018

(Continued)

OTHER PUBLICATIONS

English Translation DE-112012992283T5 (Year: 2021).*

(Continued)

*Primary Examiner* — Yewebdar T Tadesse

(74) *Attorney, Agent, or Firm* — Osha Bergman Watanabe & Burton LLP

(57) ABSTRACT

A painting robot includes a base, a swivel base, a lower arm, an upper arm, and a wrist unit. The upper arm includes a first upper arm on a base end side and a second upper arm on a tip end side. The second upper arm is supported, on a base end side, by a tip end side of the first upper arm, the first upper arm being supported by the lower arm on an inner surface that is a side surface of the first upper arm, and pivots about a fourth axis parallel to a third axis. The first upper arm is equipped with a pump for an end effector on an inner surface side.

9 Claims, 10 Drawing Sheets

(56) References Cited

U.S. PATENT DOCUMENTS

2018/0065254 A1 3/2018 Okahisa et al.

FOREIGN PATENT DOCUMENTS

| | | | | | |
|---|---|---|---|---|---|
| CN | 108115696 | A | | 6/2018 | |
| CN | 208844168 | U | | 5/2019 | |
| DE | 112019002283 | T5 | * | 2/2021 | ............. B05B 16/40 |
| JP | 2002066397 | A | * | 3/2002 | |
| JP | 2013-006235 | A | | 1/2013 | |

OTHER PUBLICATIONS

English Translation JP-2002066397A (Year: 2002).*

Office Action issued in corresponding Chinese Patent Application No. 202310220679.4, dated Jun. 28, 2025, with translation (12 pages).

Office Action issued in corresponding Chinese Patent Application No. 202310220679.4, dated Oct. 15, 2025, with translation (13 pages).

* cited by examiner

[FIG. 1]
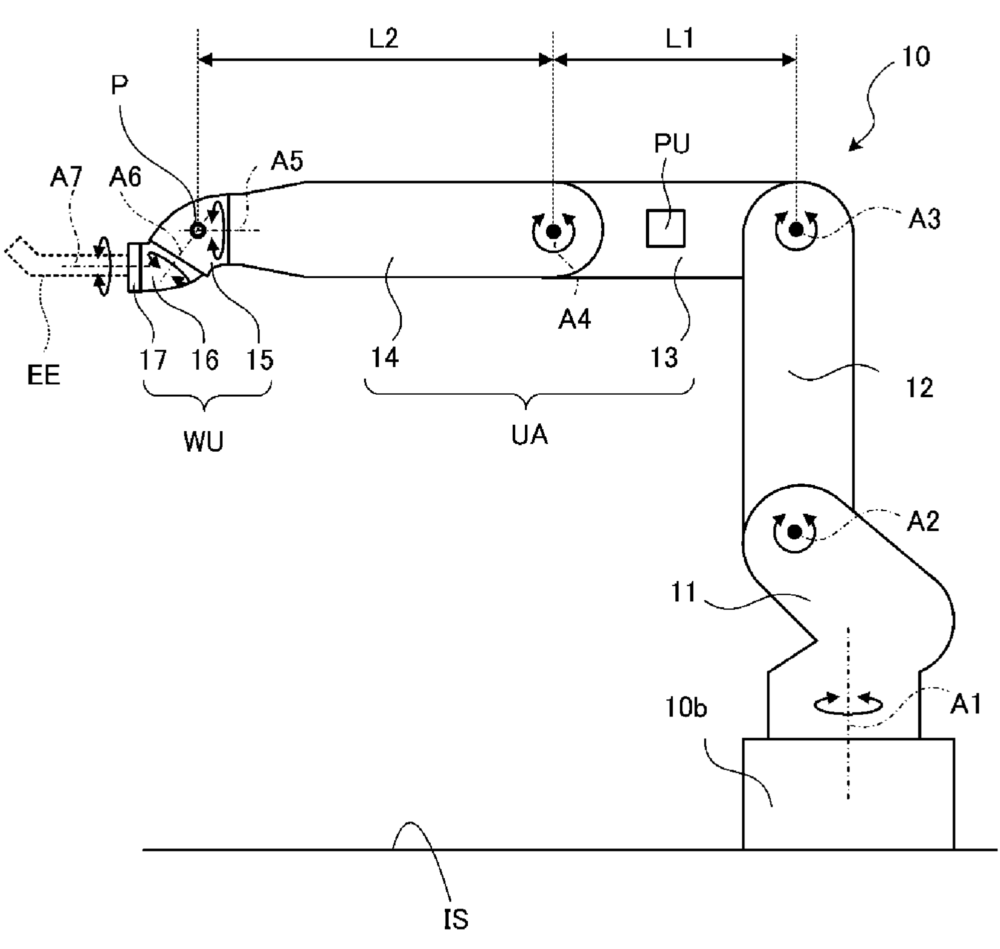
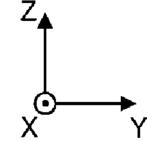

[FIG. 2A]
[FIG. 2B]
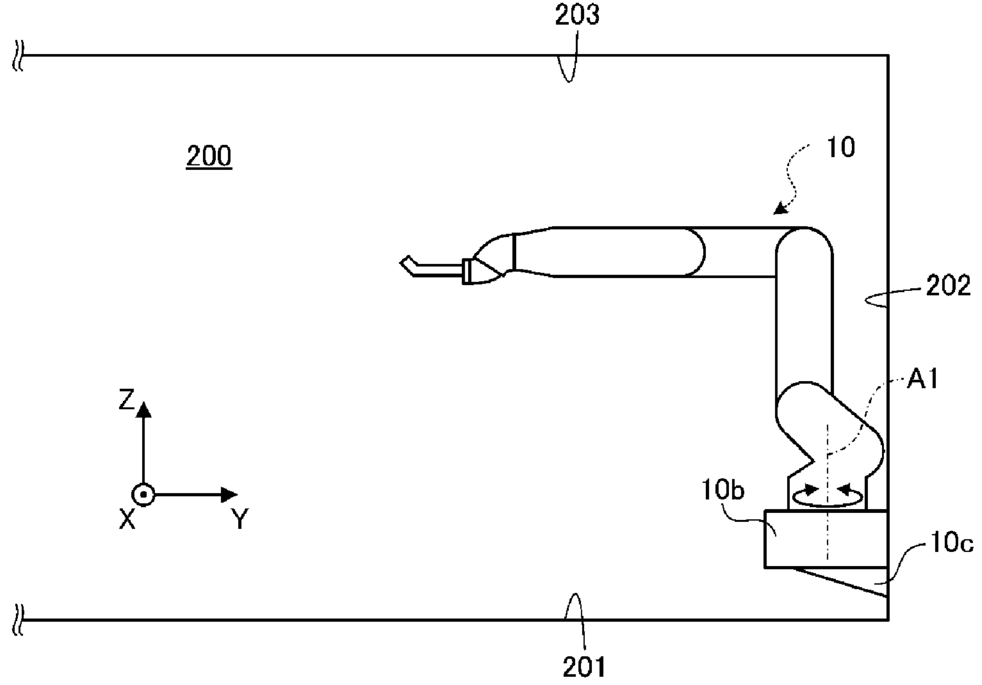

[FIG. 3A]
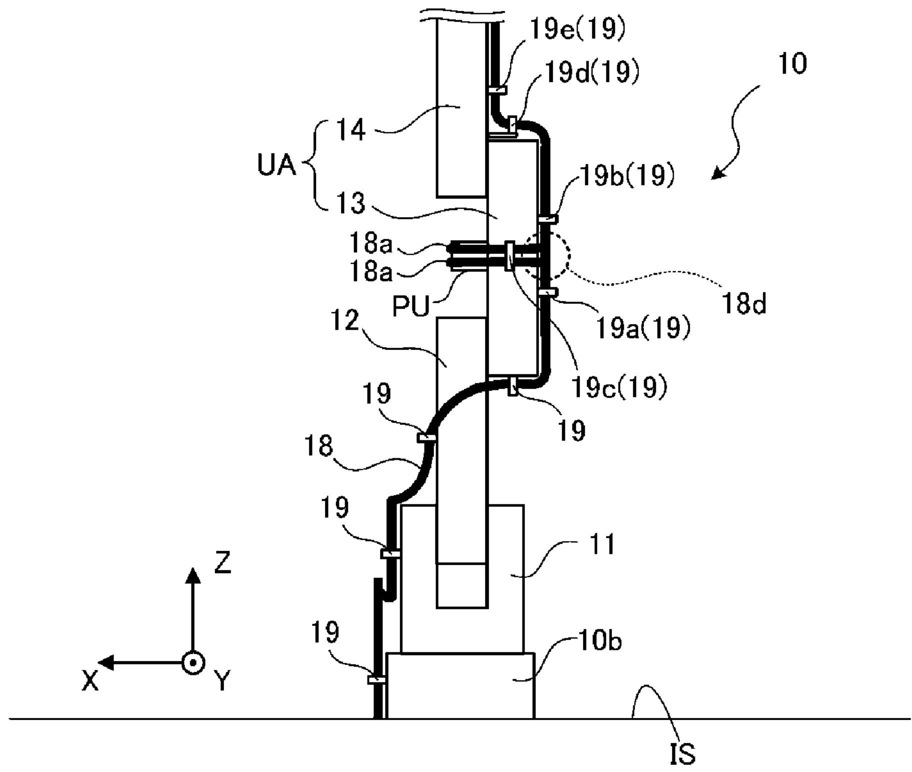
[FIG. 3B]
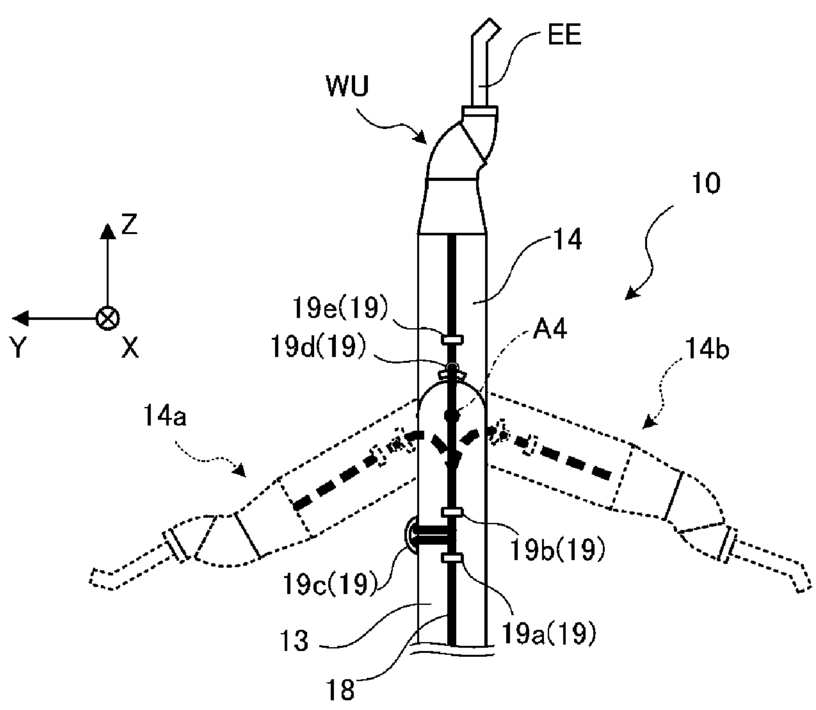

[FIG. 3C]
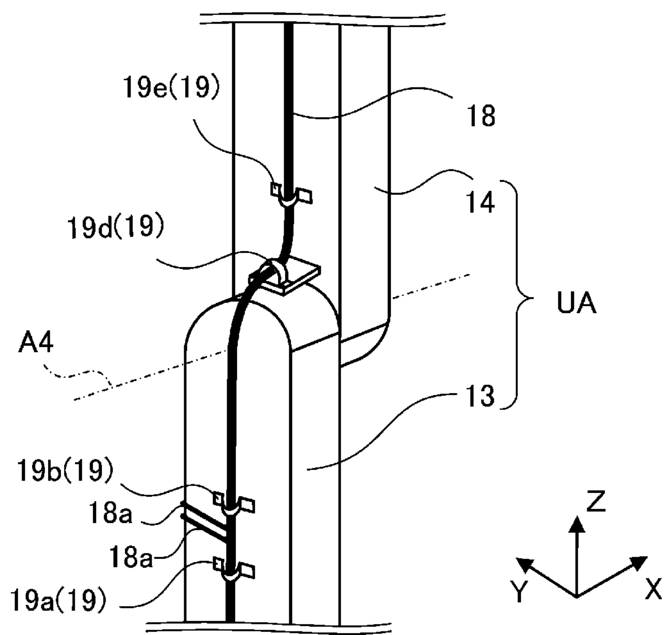
[FIG. 3D]
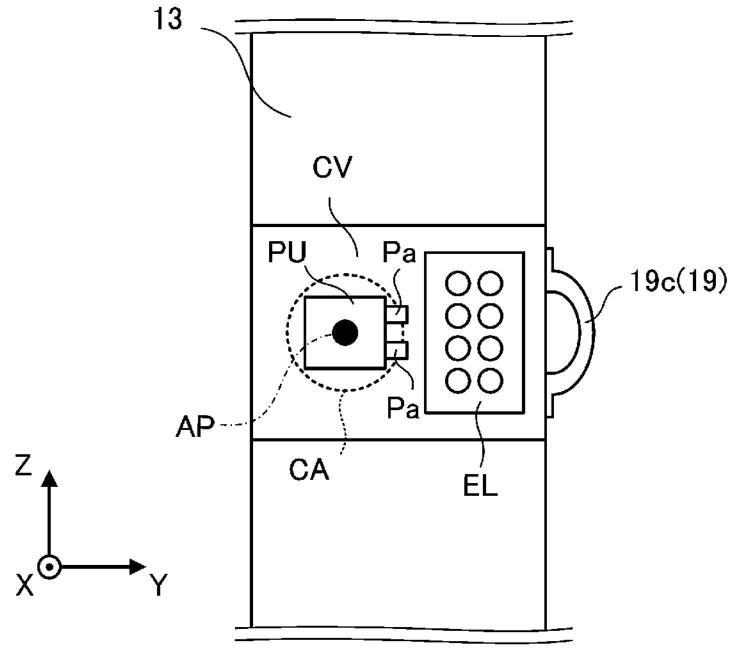

[FIG. 4]
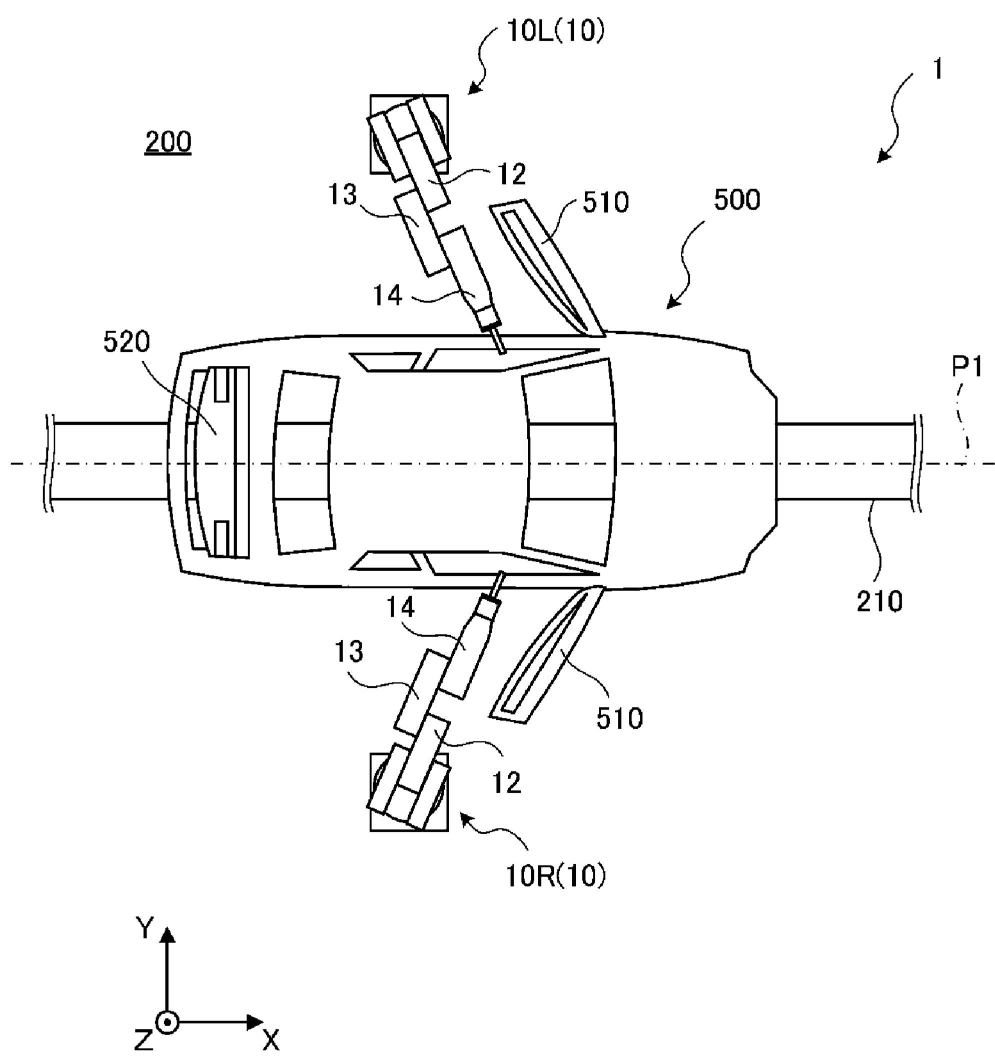

[FIG. 5]
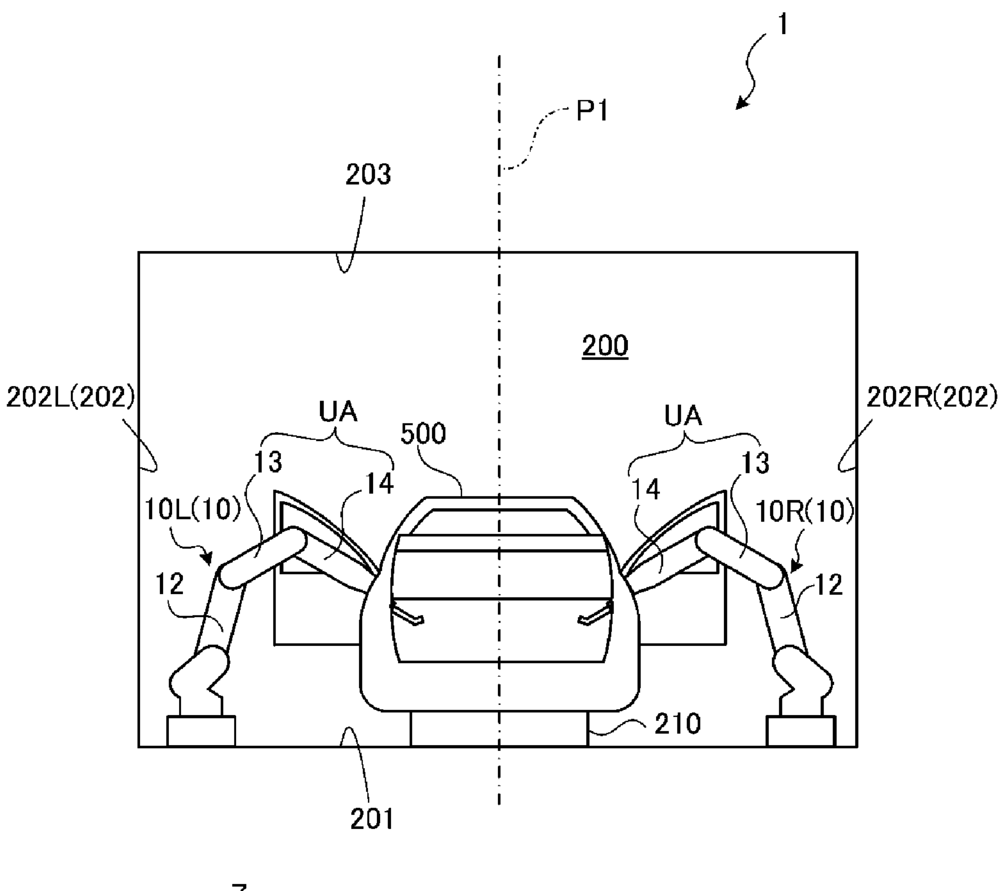
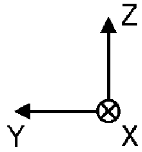

[FIG. 6A]
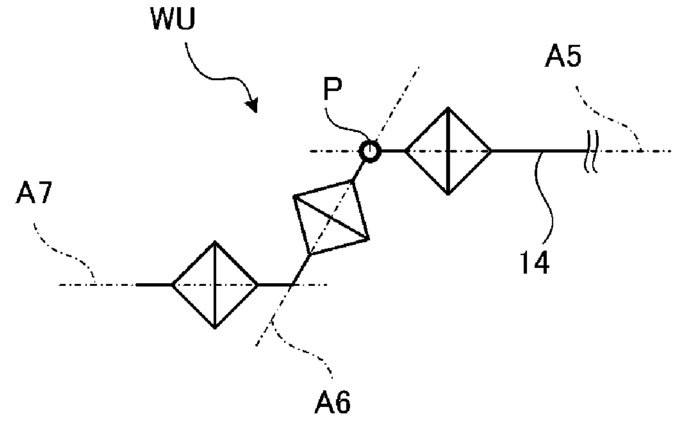
[FIG. 6B]
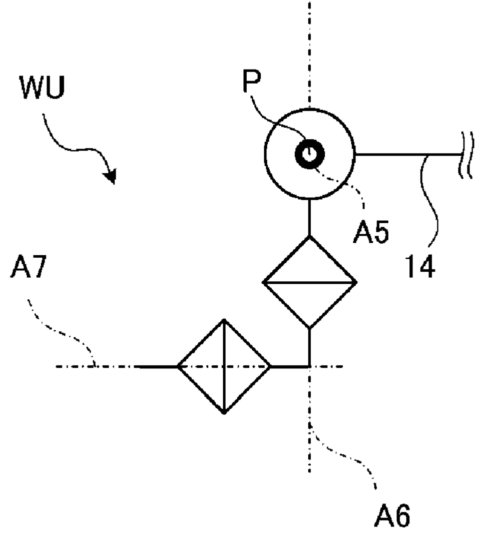

[FIG. 6C]
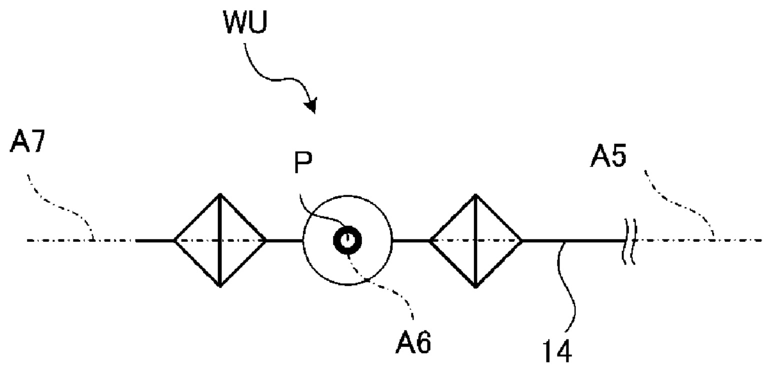
[FIG. 6D]
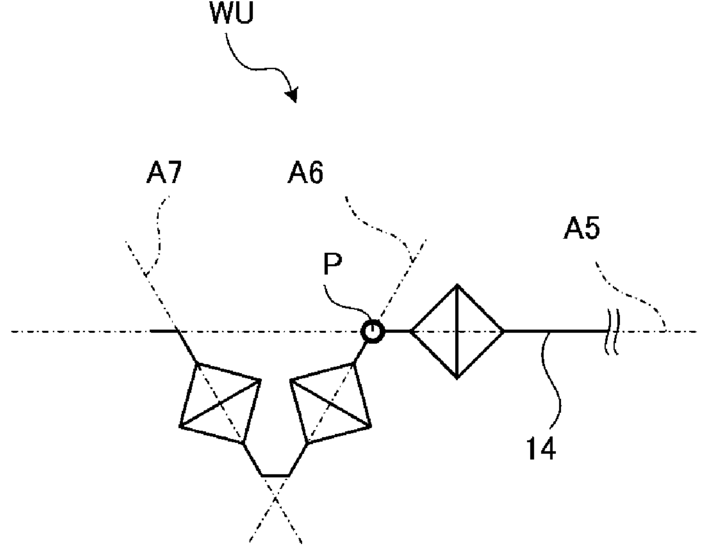

[FIG. 7]
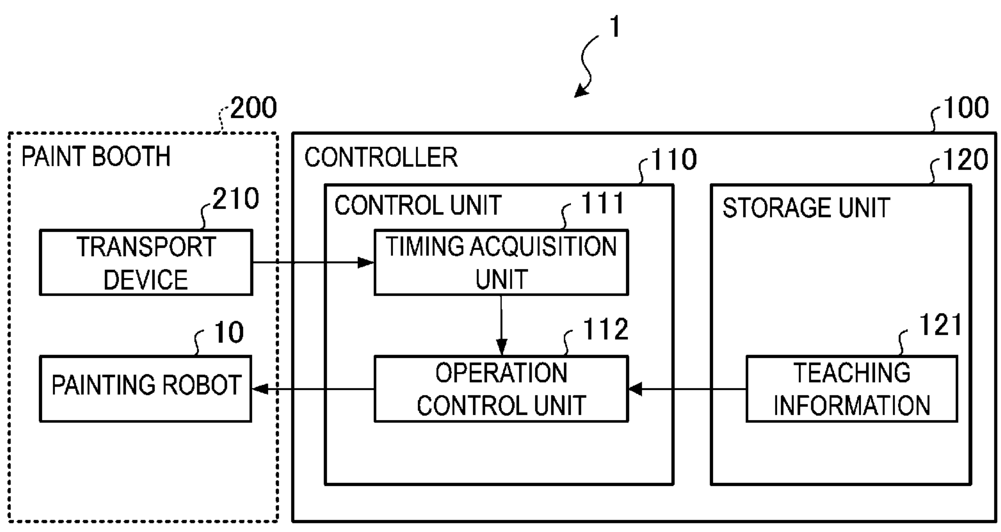

[FIG. 8]
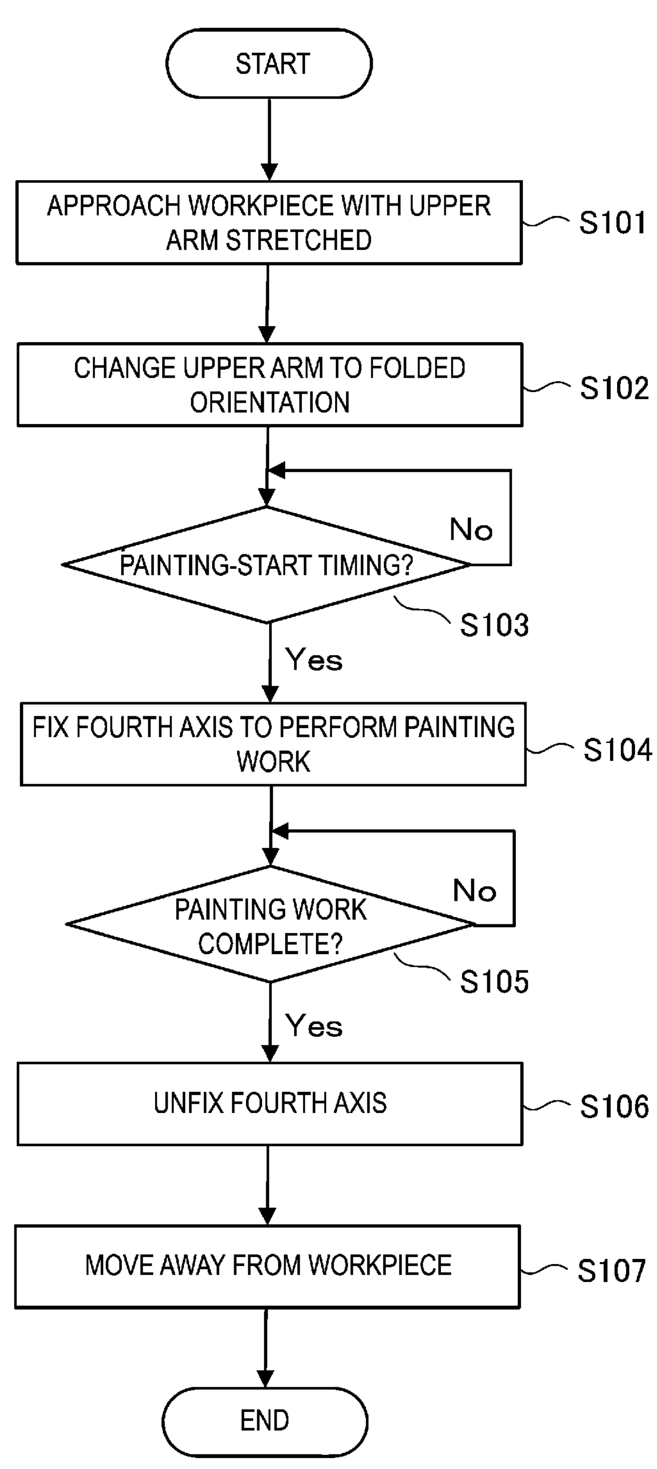

PAINTING ROBOT AND PAINTING SYSTEM

CROSS-REFERENCE TO RELATED APPLICATIONS

This application claims priority pursuant to 35 U.S.C. 119(a) to Japanese Application No. 2022-059168, filed Mar. 31, 2022, which application is incorporated herein by reference in its entirety.

TECHNICAL FIELD

Embodiments of the disclosure relate to a painting robot and a painting system.

BACKGROUND ART

Known robots operate by driving a plurality of joint portions individually from each other. An end effector suitable for applications such as welding, gripping, and the like is attached to the distal end of such a robot to perform various operations such as machining, moving a workpiece, and the like.

Further, a painting system has been proposed in which a painting robot equipped with an end effector for painting is placed inside a paint booth to paint an outer panel of an automobile body corresponding to a workpiece (for example, see Patent Document 1).

CITATION LIST

Patent Literature

Patent Document 1: JP 2013-006235 A

SUMMARY OF INVENTION

Technical Problem

However, when painting an inner panel of the body rather than an outer panel of the body, interference between the robot and the workpiece can be particularly problematic. In addition, when ensuring the distance between the workpiece and the robot to prevent interference, the paint booth is likely to be made larger.

An aspect of an embodiment provides a painting robot and a painting system with improved accessibility to a workpiece by extending an effective range of motion.

Solution to Problem

A painting robot according to an aspect of an embodiment includes a base, a swivel base, a lower arm, an upper arm, and a wrist unit. The base is fixed to an installation surface. The swivel base is supported, on a base end side, on an upper surface side of the base and swivels about a first axis along a vertical direction. The lower arm is supported, on a base end side, by the swivel base and pivots about a second axis perpendicular to the first axis. The upper arm is supported, on a base end side, by a tip end side of the lower arm and pivots about a third axis parallel to the second axis. The wrist unit has a three-axis configuration in which a base end side is supported by a tip end side of the upper arm and a tip end side is configured to receive attachment of an end effector. The upper arm includes a first upper arm on a base end side and a second upper arm on a tip end side. The second upper arm is supported, on a base end side, by a tip end side of the first upper arm, the first upper arm being supported by the lower arm on an inner surface that is a side surface of the first upper arm, and pivots about a fourth axis parallel to the third axis. The first upper arm is equipped with a pump for the end effector on the inner surface side.

A painting system according to the aspect of the embodiment includes a paint booth and the painting robot. At least a pair of the painting robots are arranged in the paint booth so as to sandwich a workpiece with respect to a transport direction of the workpiece. In the pair of painting robots, axis configurations are symmetrical to each other with respect to a transport center plane along the transport direction, and respective distances between the first axis and the transport center plane are equal to each other.

Advantageous Effects of Invention

The aspect of the embodiment can provide a painting robot and a painting system with improved accessibility to a workpiece.

BRIEF DESCRIPTION OF DRAWINGS

Various embodiments are disclosed, by way of example only, with reference to the accompanying schematic drawings in which corresponding reference symbols indicate corresponding parts, in which:

FIG. 1 is a side view of a painting robot according to an embodiment;

FIG. 2A is a diagram illustrating an example of floor-mounted installation;

FIG. 2B is a diagram illustrating an example of wall-mounted installation;

FIG. 3A is a side view illustrating fitting positions of support parts viewed from a Y-axis positive direction;

FIG. 3B is a side view illustrating the fitting positions of the support parts viewed from an X-axis negative direction;

FIG. 3C is a perspective view illustrating the fitting positions of the support parts;

FIG. 3D is a side view illustrating installation positions of a pump and an electro-pneumatic device;

FIG. 4 is a schematic top view of a painting system according to the embodiment;

FIG. 5 is a schematic side view of the painting system according to the embodiment;

FIG. 6A is a model diagram illustrating an axis configuration of a two-roll hollow wrist;

FIG. 6B is a model diagram illustrating an axis configuration of a lemma wrist;

FIG. 6C is a model diagram illustrating an axis configuration of an inline wrist;

FIG. 6D is a model diagram illustrating an axis configuration of a three-roll hollow wrist;

FIG. 7 is a block diagram illustrating a configuration of the painting system; and, FIG. 8 is a flowchart showing an operation procedure of the painting robot.

DESCRIPTION OF EMBODIMENTS

Embodiments of a painting robot and a painting system disclosed in the present application will be described in detail below with reference to the accompanying drawings. Note that this invention is not limited to the embodiments described below. Further, while a case in which a vehicle such as an automobile is an object to be painted is described in the following, the object to be painted is not limited to a vehicle. In the following, the object to be painted is described as a "workpiece".

Further, in the embodiments described below, expressions such as "perpendicular", "orthogonal", "vertical", "same", "symmetrical", and the like are used, but these states need not be satisfied in a strict sense. That is, each of the expressions described above allows for deviations in manufacturing accuracy, installation accuracy, processing accuracy, detection accuracy, and the like.

First, a painting robot 10 according to the embodiment will be described with reference to FIG. 1. FIG. 1 is a side view of the painting robot 10 according to the embodiment. In FIG. 1, for clarity of explanation, a three-dimensional orthogonal coordinate system is used, consisting of a Z-axis with a vertical upward direction as a positive direction, an X-axis with a workpiece transport direction (described below) as the positive direction, and a Y-axis orthogonal to the X-axis and the Z-axis. Such an orthogonal coordinate system may also be illustrated in other drawings used in the following description. Note that "orthogonal" means "perpendicular" to each other and "intersecting" each other.

As illustrated in FIG. 1, the painting robot 10 includes a base 10*b*, a swivel base 11, a lower arm 12, an upper arm UA, and a wrist unit WU. The base 10*b* is fixed to an installation surface IS. The swivel base 11 is supported, on a base end side, on an upper surface side of the base 10*b*, and swivels about a first axis A1 along a vertical direction (Z-axis).

Here, "pivot" refers to a motion of changing an angle formed by adjacent arms. "Rotation" refers to a motion of rotating adjacent arms relative to each other without changing the angle formed by the adjacent arms. Note that "pivot" may also refer to a motion of the arm swinging about a rotation axis, and "rotation" may also refer to a motion of the arm turning about the rotation axis along an extension direction of the arm.

The lower arm 12 is supported, on the base end side, by the swivel base 11, and pivots about the second axis A2 perpendicular to the first axis A1. The upper arm UA is supported, on the base end side, by the tip end side of the lower arm 12, and pivots about the third axis A3 parallel to the second axis A2.

The wrist unit WU has a three-axis configuration mechanism in which a base end side is supported by a tip end side of the upper arm UA and a tip end side is configured to receive attachment of an end effector EE. Specifically, the wrist unit WU includes a fifth arm 15, a sixth arm 16, and a seventh arm 17. The fifth arm 15 is supported, on a base end side, by the tip end side of the upper arm UA, and rotates about a fifth axis A5 orthogonal to a fourth axis A4. The sixth arm 16 is supported, on a base end side, by a tip end side of the fifth arm 15, and rotates about a sixth axis A6 intersecting the fifth axis A5.

A tilt angle between the fifth axis A5 and the sixth axis A6 can be any angle more than 0 degrees and less than 90 degrees on an acute angle side. The seventh arm 17 is supported, on a base end side, by a tip end side of the sixth arm 16, and rotates about the seventh axis A7 intersecting the sixth axis A6. The end effector EE (see the dashed line in FIG. 1) used for painting can be attached to a tip end side of the seventh arm 17. Note that the wrist unit WU illustrated in FIG. 1 is a so-called "two-roll hollow wrist" for painting. Thus, by providing the wrist unit WU with a hollow portion, hoses, tubes, cables, and the like can be routed in the hollow portion. Therefore, painting work can be easily performed on complex shaped workpieces without concern for interference by hoses, tubes, cables, or the like.

Here, the upper arm UA includes a first upper arm 13 on the base end side and a second upper arm 14 on the tip end side. The first upper arm 13 is supported, on a base end side, by the tip end side of the lower arm 12 and pivots about the third axis A3 described above. The second upper arm 14 is supported, on a base end side, by a tip end side of the first upper arm 13, and pivots about the fourth axis A4 parallel to the third axis A3. In other words, the upper arm UA has a two-arm configuration including the fourth axis A4 corresponding to a so-called "redundant axis", and the arm can be bent and stretched by a pivoting motion about the fourth axis A4.

In the present embodiment, a distance between the third axis A3 and the fourth axis A4 is defined as an arm length of the first upper arm 13, and a distance between a P-point P, which is an intersection between the fifth axis A5 and the sixth axis A6, and the fourth axis A4 is defined as an arm length of the second upper arm 14. Here, the arm length of the second upper arm 14 is longer than the arm length of the first upper arm 13 and shorter than twice the arm length of the first upper arm 13.

That is, when the arm length of the first upper arm 13 is "L1" and the arm length of the second upper arm 14 is "L2", a relationship of "$L1<L2<L1\times2$" is satisfied. With this relationship, the painting robot 10 can be prevented from interfering with the workpiece and the painting robot 10 can easily access the workpiece. It is further preferable to set the relationship to approximately "$L2=1.2\times L1$" from the perspective of preventing interference and improving accessibility.

When the upper arm UA has the redundant axis as described above, the upper arm UA can be bent and stretched, so that the installation position of the painting robot 10 can be made closer to the workpiece while avoiding interference with the workpiece. Further, by making the second upper arm 14 longer than the first upper arm 13, an "effective range of motion", which is a range of motion that avoids interference with the workpiece, can be extended. As a result, the accessibility of the painting robot 10 to the workpiece can be improved.

As illustrated in FIG. 1, the second upper arm 14 is supported, on a base end side, by an "inner surface", which is a side surface of the first upper arm 13 supported by the lower arm 12. The first upper arm 13 is equipped with a pump PU for the end effector EE on the side of this inner surface.

Thus, by providing the second upper arm 14 on the inner surface of the first upper arm 13 being the side surface where the first upper arm 13 is supported by the lower arm 12, a space is created between the tip end side of the lower arm 12 and the base end side of the second upper arm 14 on the inner surface side of the first upper arm 13, which is less likely to interfere with obstacles.

Then, by providing the pump PU for the end effector EE in this space, the effective range of motion can be extended to avoid interference with the workpiece. Thus, the accessibility of the painting robot 10 to the workpiece can be improved. In addition, the distance between the pump PU and the end effector EE can be shorter than when the pump PU is provided on any arm closer to the base end of the painting robot 10 than the first upper arm 13 or when the pump PU is provided outside the painting robot 10. Therefore, loss of paint can be reduced and paint quality can be improved.

Here, although the pump PU is indicated by a rectangular symbol in FIG. 1, the shape of the pump PU is not limited. That is, the shape of the pump PU can be freely designed. An actuator that drives the pump PU is installed inside the first upper arm 13 from the viewpoint of explosion-proofing, which will be described later with reference to FIG. 3D.

The axis configuration of the painting robot 10 illustrated in FIG. 1 can be applied to a mirror configuration with respect to a symmetry plane parallel to the vertical axis (Z-axis), and this point will be described later with reference to FIG. 4 and others. Further, the wrist unit WU illustrated in FIG. 1 may have a different axis configuration, and this point will be described later with reference to FIGS. 6A to 6D.

Next, an example of installation of the painting robot 10 illustrated in FIG. 1 in a paint booth 200 will be described with reference to FIGS. 2A and 2B. FIG. 2A is a diagram illustrating an example of floor-mounted installation, and FIG. 2B is a diagram illustrating an example of wall-mounted installation. As illustrated in FIGS. 2A and 2B, the paint booth 200 is a semi-closed space surrounded by a floor 201, a pair of walls 202 (one of which is not illustrated), and a ceiling 203, and can be opened to an upstream side (X-axis negative direction side) and a downstream side (X-axis positive direction side) in the workpiece transport direction.

Note that both FIGS. 2A and 2B illustrate a case where the painting robot 10 is installed near the wall 202 on the left side (Y-axis positive direction side) in the paint booth 200 in the workpiece transport direction (X-axis positive direction). Further, the directional views in FIGS. 2A and 2B are the same as the directional view in FIG. 1.

When the painting robot 10 is floor-mounted as illustrated in FIG. 2A, a bottom surface of the base 10*b* is fixed to the floor 201 in the paint booth 200. Here, the first axis A1 of the painting robot 10 is parallel to the vertical axis (Z-axis). Note that while FIG. 2A illustrates a case in which the base 10*b* is directly fixed to the floor 201, the base 10*b* may be fixed on a stand fixed to the floor 201.

As illustrated in FIG. 2B, when the painting robot 10 is wall-mounted, the painting robot 10 is wall-mounted on the wall 202 in the paint booth 200 using an auxiliary member 10*c* provided on the lower surface side of the base 10*b*. Here, the first axis A1 of the painting robot 10 is parallel to the vertical axis (Z-axis), as in the case illustrated in FIG. 2A. Note that while FIG. 2B illustrates a case in which the base 10*b* is installed so that a side surface of the base 10*b* is in contact with the wall 202, the side of the base 10*b* may be installed away from the wall 202. Further, the auxiliary member 10*c* may be omitted and the side surface of the base 10*b* may be fixed to the wall 202.

Note that while FIGS. 2A and 2B illustrate a case in which the painting robot 10 is disposed so that the first axis A1 of the painting robot 10 is parallel to the vertical axis (Z-axis), the painting robot 10 may be disposed in an orientation in which the first axis A1 is inclined with respect to the vertical axis (Z-axis).

For example, the painting robot 10 may be disposed such that the first axis A1 is parallel to a YZ plane illustrated in FIGS. 2A and 2B, and is in a range of 45 degrees to 90 degrees with respect to the Y-axis. Here, 90 degrees corresponds to the orientation illustrated in FIGS. 2A and 2B. When the painting robot 10 is disposed inclined in this manner, the floor 201 or the wall 202 may be inclined, or the base 10*b* or the auxiliary member 10*c* may be inclined.

Next, a plurality of support parts 19 that support a linear body 18 routed on the painting robot 10 toward the end effector EE illustrated in FIG. 1 will be described with reference to FIGS. 3A, 3B, and 3C. FIG. 3A is a side view illustrating fitting positions of the support parts 19 viewed from the Y-axis positive direction, and FIG. 3B is a side view illustrating the fitting positions of the support parts 19 viewed from the X-axis negative direction. FIG. 3C is a perspective view illustrating the fitting positions of the support parts 19. The linear body 18 has flexibility and deflects when receiving an external force.

FIG. 3A corresponds to a side view of the painting robot 10 viewed from the wall surface 202 illustrated in FIG. 2A. Note that the orientation of the painting robot 10 illustrated in FIG. 3A is different from the orientation illustrated in FIG. 1. Hereinafter, when particularly distinguishing the plurality of support parts 19, lower-case letters such as "a", "b", and the like are added to the reference numerals.

Here, the linear body 18 includes hoses and tubes for supplying paint and gas, and cables for transmitting electrical signals to the end effector EE. Note that the plurality of hoses, tubes, and cables may be bundled together with a tie or the like, or may be disposed together in a large tube.

FIG. 3A illustrates the painting robot 10 with the lower arm 12, the first upper arm 13, and the second upper arm 14 illustrated in FIG. 1 extending vertically upward. That is, the extension direction of the lower arm 12, the first upper arm 13, and the second upper arm 14 is parallel to the Z-axis.

Here, in the orientation illustrated in FIG. 3A, the "front" of each arm is a side surface on a Y-axis negative direction side, and the "rear" of each arm is a side surface on the Y-axis positive direction side. In other words, in the orientation illustrated in FIG. 3A, a side surface on a side far from the first axis A1 (see FIG. 1) is the "front" of each arm, and a side surface on a side near the first axis A1 is the "rear" of each arm. Note that in FIG. 3A, illustration beyond the tip end side of the second upper arm 14 is omitted.

In the orientation illustrated in FIG. 3A, the "inner surface" of each arm is a side surface on the X-axis positive direction side, and the "outer surface" of each arm is a side surface on the X-axis negative direction side. In other words, the outer surface of each arm is the surface opposite to the inner surface. For example, the inner surface of the first upper arm 13 is supported by the outer surface of the lower arm 12, and the outer surface of the second upper arm 14 is supported by the inner surface of the first upper arm 13. A pump PU is provided on the inner surface of the first upper arm 13.

In other words, in the painting robot 10, the second upper arm 14 is supported by the first upper arm 13 on a side surface on which the first upper arm 13 is supported by the lower arm 12. That is, the second upper arm 14 and the lower arm 12 are connected to the same side surface (inner surface) of the first upper arm 13, respectively.

The linear body 18 is led out from the installation surface IS and routed outside the painting robot 10, and is introduced from the outside of the second upper arm 14 into the hollow portion of the wrist unit WU (see FIG. 1). Then, one end of the linear body 18 is connected to the end effector EE (see FIG. 1). A portion where the linear body 18 passes through the paint booth 200 (see FIG. 2A) may be any one of outer walls (including a floor wall and a ceiling wall) surrounding the periphery of the paint booth 200.

As illustrated in FIG. 3A, the linear body 18 passes through the inner surface sides of the base 10*b*, the swivel base 11, and the lower arm 12, while curving across the rear side of the lower arm 12, and is routed to the outer surface side of the first upper arm 13, for example. Note that this routing path is an example, and other paths may be adopted. The linear body 18 is branches into a pair of branch linear bodies 18*a* at a branch portion 18*d*, and each of the pair of branch linear bodies 18*a* is connected to the pump PU provided on the inner surface side of the first upper arm 13. One of the pair of branch linear bodies 18*a* is connected to the input side of the pump PU, and the other of the pair of branch linear bodies 18*a* is connected to the output side of the pump PU. Note that the number of input side linear bodies included in the one of the pair of branch linear bodies 18*a* and the number of output side linear bodies included in the other of the pair of branch linear bodies 18*a* may be different from each other.

That is, the linear body 18 includes the pair of branch linear bodies 18*a* branching from the outer surface side of the first upper arm 13. Each of the pair of branch linear bodies 18*a* is connected to the pump PU along the side surface connecting the outer surface and the inner surface of the first upper arm 13. Thus, the pair of branch linear bodies 18*a* branching from the linear body 18 are not routed inside the first upper arm 13, but are routed from the outer surface side to the inner surface side across the outside of the first upper arm 13, thereby allowing for downsizing of the first upper arm 13. In FIGS. 3A and 3B, an example in which both of the pair of branch linear bodies 18*a* are connected to the pump PU along the side surface on the Y-axis positive direction side is illustrated, but both of the pair of branch linear bodies 18*a* may be arranged along the side surface on the Y-axis negative direction side. Alternatively, one of the pair of branch linear bodies 18*a* may be arranged along the side surface on the Y-axis positive direction side and the other of the pair of branch linear bodies 18*a* may be arranged along the side surface on the Y-axis negative direction side.

The linear body 18 is then routed to the outer surface of the second upper arm 14 along the extension direction of the first upper arm 13, and is connected to the end effector EE (see FIG. 1) along the extension direction of the second upper arm 14.

In the example of the routing path illustrated in FIG. 3A, the plurality of support parts 19 are provided on the inner surface sides of the base 10*b*, the swivel base 11, and the lower arm 12, respectively. The support parts 19 are provided on the base end side, the outer surface, and the side surface connecting the inner surface and the outer surface, of the first upper arm 13, respectively. When the linear body 18 is routed on the outer surface sides of the base 10*b*, the swivel base 11, and the lower arm 12, the corresponding support parts 19 are provided on the outer surface sides thereof.

At least one of the plurality of support parts 19 is provided on the outer surface of the first upper arm 13 and supports the linear body 18 along the extension direction of the first upper arm 13. Thus, the support part 19 that supports the linear body 18 is provided on the outer surface of the first upper arm 13, and the linear body 18 is supported along the extension direction of the first upper arm 13, so that the linear body 18 can be supported so as to fit in the side silhouette of the first upper arm 13. Therefore, a risk of interference between the linear body 18 and obstacles can be reduced.

Two of the plurality of support parts 19 are provided, each one respectively on the tip end side and the base end side of a portion (branch portion 18*d*) where the pair of branch linear bodies 18*a* branch from the linear body 18. Thus, by providing the support parts 19 on the tip end side and the base end side of the branch portion 18*d*, respectively, the linear body 18 is prevented from separating from the surface of the painting robot 10. In FIG. 3A, the support part 19 provided on the tip end side relative to the branch portion 18*d* is indicated as a support part 19*b*, and the support part 19 provided on the base end side of the branch portion 18*d* is indicated as a support part 19*a*.

The pair of branch linear bodies 18*a* are collectively supported by a support part 19*c*, which is the support part 19 provided on the side surface connecting the outer surface and the inner surface of the first upper arm 13. Thus, by providing the support part 19*c* that supports the pair of branch linear bodies 18*a*, the branch linear bodies 18*a* are prevented from separating from the surface of the painting robot 10. Note that the support parts 19 may be provided to separately support each of the pair of branch linear bodies 18*a*.

A protruding support part 19*d* is provided on the second upper arm 14 side of a joint portion connecting the first upper arm 13 and the second upper arm 14, and supports the linear body 18 at a position protruding toward the first upper arm 13 side along the fourth axis A4 (see FIG. 1). The protruding support part 19*d* supports the linear body 18 at a position radially away from the fourth axis A4 so that the first upper arm 13 does not interfere with the linear body 18 at least within a movable range of the second upper arm 14. Thus, by supporting the linear body 18 by the protruding support part 19*d*, even when a relative angle between the first upper arm 13 and the second upper arm 14 changes, the linear body 18 can be prevented from rubbing against the first upper arm 13. Even when the shape of the outer surface of the second upper arm 14 is such that the tip end side is offset to the X-axis positive direction side relative to the portion supported by the first upper arm 13, the protruding support part 19*d* is provided so as to satisfy the condition of the support position described above.

A support part 19*e* is provided on the outer surface of the second upper arm 14, and supports the linear body 18, which is supported by the protruding support part 19*d* and directed toward the end effector EE (see FIG. 1), along the extension direction of the second upper arm 14.

Next, FIG. 3B will be used to illustrate. FIG. 3B corresponds to a side view of the painting robot 10 in the orientation illustrated in FIG. 3A, viewed from the X-axis negative direction side. In FIG. 3B, the same orientation as in FIG. 3A is indicated by solid lines, and an orientation 14*b* in which the second upper arm 14 is pivoted clockwise and an orientation 14*a* in which the second upper arm 14 is pivoted counterclockwise are indicated by dashed lines.

As indicated by the solid lines in FIG. 3B, by providing the support part 19*a* and the support part 19*b* along the center line of the first upper arm 13 in the extension direction, the linear body 18 is supported along the extension direction of the first upper arm 13. Further, by providing the protruding support part 19*d* and the support part 19*e* along the center line of the second upper arm 14 in the extension direction, the linear body 18 is supported along the extension direction of the second upper arm 14.

Thus, as illustrated by the solid lines in FIG. 3B, the linear body 18 can be supported so as to fit in the side silhouette of the first upper arm 13, and can be supported so as to fit in the side silhouette of the second upper arm 14.

Here, since the linear body 18 is flexible, even when the second upper arm 14 is pivoted with respect to the first upper arm 13, the linear body 18 smoothly deflects between the support part 19*b* provided on the first upper arm 13 and the protruding support part 19*d* provided on the second upper arm 14. Thus, even when the second upper arm 14 is pivoted with respect to the first upper arm 13, the linear body 18 can fit in the side silhouettes of the first upper arm 13 and the second upper arm 14. This reduces the risk of interference between the linear body 18 and obstacles (see the dashed lines in FIG. 3B).

Next, mainly the protruding support part 19*d* will be described with reference to FIG. 3C. FIG. 3C corresponds to a perspective view of the upper arm UA viewed obliquely from above on the first upper arm 13 side. As illustrated in FIG. 3C, each support part 19 is formed including a semicircular member through which the linear body 18 passes, and is attached to the surface of the upper arm UA. Although the semicircular member is illustrated large with respect to the linear body 18 in FIG. 3C, the semicircular member preferably has a size enough to circumscribe the linear body 18.

The protruding support part 19*d* provided on the second upper arm 14 includes a member protruding from the second upper arm 14 toward the first upper arm 13 along the fourth axis A4, and the above-described semicircular member is disposed on the tip end side of this member. Thus, the protruding support part 19*d* supports the linear body 18 at a position closer to the outer surface of the first upper arm 13 than to the outer surface of the second upper arm 14.

Therefore, even when the second upper arm 14 is pivoted, the linear body 18 is less likely to rub against the first upper arm 13, thereby increasing the durability of the linear body 18. Although the member of the protruding support part 19*d* protruding from the second upper arm 14 is illustrated as having a flat plate shape in FIG. 3C, the member may have a curved shape along the tip end of the first upper arm 13.

Next, installation positions of the pump PU and the electro-pneumatic device EL will be described with reference to FIG. 3D. FIG. 3D is a side view illustrating the installation positions of the pump PU and the electro-pneumatic device EL. Note that FIG. 3D corresponds to a side view of the first upper arm 13 illustrated in FIG. 3C, viewed from the X-axis positive direction side. In FIG. 3D, the linear body 18 illustrated in FIG. 3C and others is omitted.

As illustrated in FIG. 3D, the first upper arm 13 is equipped with the pump PU and the electro-pneumatic device EL on the inner surface side. Here, the electro-pneumatic device EL is a device such as an electromagnetic valve, an electro-pneumatic regulator or the like, and adjusts an amount and timing of a liquid or gas passage. FIG. 3D illustrates a case where the pump PU and the electro-pneumatic device EL are covered with a cover CV that can be attached to and detached from the first upper arm 13. Thus, the use of the cover CV facilitates maintenance of the pump PU and the electro-pneumatic device EL. The cover CV is provided with a member such as a gasket in order to ensure airtightness inside the first upper arm 13.

Here, the pump PU refers to a pump mechanism provided outside the first upper arm 13, but a rotary actuator CA, which is provided inside the first upper arm 13 and drives the pump mechanism, and the pump mechanism may be collectively referred to as the pump PU.

The pump PU includes a pair of connection portions Pa on the support part 19*c* side (also illustrated in FIG. 3A). The pair of branch linear bodies 18*a* illustrated in FIG. 3C and the like are connected to the pair of connection portions Pa, respectively. One of the pair of connection portions Pa is for input, and another of the pair of connection portions Pa is for output. Here, a rotation shaft of the rotary actuator CA that drives the pump mechanism is referred to as a pump shaft AP.

The pump shaft AP is parallel to the fourth axis A4 illustrated in FIG. 3C. That is, the pump shaft AP protrudes from the rotary actuator CA toward the pump mechanism, and drives gears or the like provided inside the pump mechanism, thereby causing the pump mechanism to discharge paint toward the end effector EE (see FIG. 1).

Thus, by disposing the pump mechanism on the inner surface side of the first upper arm 13 while disposing the rotary actuator CA inside the first upper arm 13, the size of the first upper arm 13 can be reduced while easily adapting to an explosion-proof environment.

Further, by orienting the pump shaft AP in a normal direction of the inner surface of the first upper arm 13, the pump PU is less likely to interfere with obstacles or the painting robot 10 even when the first upper arm 13 or the second upper arm 14 (see FIG. 3C) is pivoted. Thus, the effective range of motion of the painting robot 10 can be extended.

The electro-pneumatic device EL is provided on the inner surface side of the first upper arm 13 so as to be aligned with the pump PU. The electro-pneumatic device EL is disposed inside the first upper arm 13, and a part thereof is exposed to the outside through the cover CV, or is not exposed and is connected to a joint, a tube, and the like exposed to the outside. The circular symbols illustrated in FIG. 3D represent input and output connection portions of the electro-pneumatic device EL. Here, although eight connection portions are illustrated in FIG. 3D, the number of connection portions is not limited. In other words, the number of connection portions may be any number.

Although the electro-pneumatic device EL is disposed on the Y-axis positive direction side of the pump PU in FIG. 3D, the electro-pneumatic device EL may be disposed on the Y-axis negative direction side of the pump PU. Alternatively, the electro-pneumatic device EL may be disposed on the Z-axis positive direction side of the pump PU or may be disposed on the Z-axis negative direction side thereof.

As illustrated in FIG. 3D, the first upper arm 13 is equipped with the electro-pneumatic device EL for the end effector EE (see FIG. 1) on the inner surface side so as to be aligned with the pump PU. Thus, by providing the electro-pneumatic device EL near the pump PU, the distance between the electro-pneumatic device EL and the end effector EE can be shortened, thereby enhancing the responsiveness of the end effector EE.

Next, a painting system 1 including the painting robot 10 illustrated in FIG. 1 and others will be described with reference to FIGS. 4 and 5. FIG. 4 is a schematic top view of the painting system 1 according to the embodiment, and FIG. 5 is a schematic side view of the painting system 1 according to the embodiment. Note that FIGS. 4 and 5 illustrate a case in which a workpiece 500 is a vehicle. Although one pair of painting robots 10 is illustrated in FIGS. 4 and 5, respectively, two or more pairs of painting robots 10 may be included in the painting system 1. In FIGS. 4 and 5, the pair of painting robots 10 are illustrated as being installed directly in front of each other with respect to the transport center plane P1, but the pair of painting robots 10 may be installed so as to be offset from each other with respect to a transport direction. When two or more pairs of painting robots 10 are included in the painting system 1, each of the painting robots 10 may be alternately arranged with respect to the transport direction.

Further, in the following, a transport direction (X-axis positive direction) of a transport device 210 provided in the paint booth 200 is referred to as a "downstream side", a reverse direction of the transport direction is referred to as an "upstream side", a right side toward the transport direction is referred to as a "right side", and a left side toward the transport direction is referred to as a "left side". Further, in a top view, a plane passing through the center of the transport device 210 in the transport direction is referred to as a transport center plane P1.

Note that for the plurality of painting robots 10 installed in the paint booth 200, letters are added to the end of each reference numbers for identification. For example, "R" is added to the painting robot 10 installed on the right side of the transport device 210, and "L" is added to the painting robot 10 installed on the left side.

Here, the workpiece 500 is, for example, symmetrical with respect to the transport center plane P1. However, the workpiece 500 need not be strictly symmetrical. The shape of the workpiece 500 need only be such that a painting robot 10L on the left side and a painting robot 10R on the right side of the workpiece 500 can perform the same operation. Note that the painting robot 10L performs painting work on the left side of the workpiece 500 and the painting robot 10R performs painting work on the right side of the workpiece 500.

As illustrated in FIG. 4, the workpiece 500 is symmetrical with respect to the transport center plane P1, so that each of the robots facing each other across the transport device 210 performs painting work on the workpiece 500 while performing motions symmetrical to each other.

Hereinafter, individual devices installed in the paint booth 200 will be described. The transport device 210 and the painting robots 10 are installed in the paint booth 200. Here, the paint booth 200 is a room for painting having a space isolated from the outside, as described above.

The transport device 210, such as a conveyor belt, is installed on the floor 201 (see FIG. 2A) in the paint booth 200. The transport device 210 transports the workpiece 500 at a predetermined speed in a predetermined transport direction (X-axis positive direction in FIG. 4). Note that the workpiece 500 is transported in a state fixed to a movable portion of the transport device 210 by a jig (not illustrated) or the like.

Note that the painting robot 10 is a robot that paints the workpiece 500. The configuration of the painting robot 10 has already been described with reference to FIG. 1 and others, so further description will be omitted here. Note that the painting robot 10 can increase the internal pressure by introducing a gas such as a nonflammable gas, thereby suppressing the inflow of gas from the outside.

The painting robot 10R and the painting robot 10L are positioned symmetrically with respect to the transport center plane P1, respectively. That is, the respective distances from the first axis A1 (illustrated in FIG. 1) of the painting robot 10R and the painting robot 10L to the transport center plane P1 are equal to each other. Further, the respective "arm configurations" of the painting robot 10R and the painting robot 10L are symmetrical with respect to the transport center plane P1. Here, "arm configuration" refers to the arrangement of the axes about which the respective arms pivot or rotate. The arrangement of the axes includes angles formed by axes adjacent to each other, and distances between axes adjacent to each other.

That is, when the "arm configurations" are symmetrical, differences in the profile and shape of the arm do not matter. In other words, even when the profiles and shapes of the arms differ, the arm configurations are symmetrical as long as the arrangements of the axes are symmetrical. Similarly, even when the profiles and shapes of the arms differ, the arm configurations are the same as long as the arrangements of the axes are the same.

Thus, by using robots with symmetrical arm configurations, teaching data can be inverted for use, thereby reducing the cost of generating the teaching data and reducing the manufacturing cost of the robots.

FIG. 4 illustrates the workpiece 500 with side doors 510 and a rear tailgate 520 open. The painting robots 10 perform painting work on the inside of the doors 510 and on the inside of the vehicle while avoiding interference with the workpiece 500. By arranging the painting robots 10 with symmetrical axis configurations at equal distances with respect to the transport center plane P1 across the workpiece 500 as described above, the teaching data can be reused, thereby making the teaching work more efficient.

Here, as illustrated in FIG. 4, each of the pair of painting robots 10 (the painting robot 10R and the painting robot 10L) is disposed so that the first upper arm 13 is disposed on the upstream side (the X-axis negative direction side) relative to the lower arm 12 in the transport direction. By disposing each of the painting robots 10 in this manner, for example, it is easier to avoid interference between the first upper arm 13 and the door 510, and painting work can be performed rapidly.

FIG. 5 corresponds to a side view of the painting system 1 illustrated in FIG. 4, as viewed from the upstream side in the transport direction of the workpiece 500. As illustrated in FIG. 5, each of the painting robots 10 can perform painting work on the workpiece 500 with the upper arm UA in a folded state. In addition, interference with the workpiece 500 to be transported can be avoided by stretching the upper arm UA while it swings up, for example.

Note that in FIG. 5, the first axis A1 (see FIG. 1) of each of the pair of painting robots 10 is disposed in an orientation along the vertical direction (Z-axis), but each of the painting robots 10 may be disposed in an orientation in which the first axis A1 is inclined with respect to the vertical axis (Z-axis). Specifically, the pair of painting robots 10 may be disposed in such orientations that the first axes A1 intersect at the transport center plane P1 above the bases 10*b* (see FIG. 1). In this manner, by disposing each of the painting robots 10 at an angle so as to lean forward with respect to the workpiece 500, flexible painting work suited to workpieces 500 having various shapes can be performed while avoiding interference with the workpieces 500.

Next, variations of the wrist unit WU illustrated in FIG. 1 will be described with reference to FIGS. 6A to 6D. FIG. 6A is a model diagram illustrating an axis configuration of a two-roll hollow wrist, and FIG. 6B is a model diagram illustrating an axis configuration of a lemma wrist. FIG. 6C is a model diagram illustrating an axis configuration of an inline wrist, and FIG. 6D is a model diagram illustrating an axis configuration of a three-roll hollow wrist.

Here, FIG. 6A corresponds to the wrist unit WU illustrated in FIG. 1, and FIGS. 6B, 6C, and 6D correspond to variations of the wrist unit WU illustrated in FIG. 1. Although the wrist units WU illustrated in FIGS. 6A to 6D have different axis configurations from each other, they all have a common feature of having a three-axis configuration.

Further, in FIGS. 6A to 6D, each of the joint portions of the wrist units WU is expressed as symbols. Specifically, a rectangular symbol represents a "rotation joint", and a circular symbol represents a "pivoting joint". Here, a straight line connecting the diagonals of the rectangular symbol corresponds to a rotation plane of the joint, and indicates that the joint rotates about another diagonal line, which is the rotation axis.

A dot on a circle symbol indicates a pivoting axis, and the joint pivots about this pivoting axis. Note that in FIGS. 6A to 6D, the second upper arm 14 illustrated in FIG. 1 is expressed as symbols and a straight line, and the straight line indicates the extension direction of the second upper arm 14. However, each of FIGS. 6A to 6D merely illustrates the axis configuration and does not distinguish between hollow structures and solid structures. Note that, in general, painting robots adopt a hollow structure that allows for the routing of hoses, tubes, cables, and the like inside the wrist unit WU in any variation.

The wrist unit WU illustrated in FIG. 6A is a so-called "two-roll hollow wrist", as described above with reference to FIG. 1. As illustrated in FIG. 6A, the wrist unit WU rotates about the fifth axis A5 that overlaps the second upper arm 14 expressed as symbols, and also rotates about the sixth axis A6 that inclines and intersects the fifth axis A5. Further, the wrist unit WU rotates about the seventh axis A7. Note that the P-point P described above with reference to FIG. 1 is the intersection between the fifth axis A5 and the sixth axis A6.

The wrist unit WU illustrated in FIG. 6B is a so-called "lemma wrist". As illustrated in FIG. 6B, the wrist unit WU pivots about the fifth axis A5 perpendicular to the extension direction of the second upper arm 14 and rotates about the sixth axis A6 orthogonal to the fifth axis A5. In addition, the wrist unit WU rotates about the seventh axis A7 orthogonal to the sixth axis A6. Note that the P-point P is the intersection between the fifth axis A5 and the second upper arm 14 expressed as symbols.

The wrist unit WU illustrated in FIG. 6C is a so-called "inline wrist". As illustrated in FIG. 6C, the wrist unit WU rotates about the fifth axis A5 that overlaps the second upper arm 14 expressed as symbols, and pivots about the sixth axis A6 orthogonal to the fifth axis A5. In addition, the wrist unit WU rotates about the seventh axis A7 orthogonal to the sixth axis A6. Note that the P-point P is the intersection between the fifth axis A5 and the sixth axis A6.

The wrist unit WU illustrated in FIG. 6D is a so-called "three-roll hollow wrist". As illustrated in FIG. 6D, the wrist unit WU rotates about the fifth axis A5 that overlaps the second upper arm 14 expressed as symbols, and rotates about the sixth axis A6 that inclines and intersects the fifth axis A5. Further, the wrist unit WU rotates about the seventh axis A7 that inclines and intersects the fifth axis A5 and the sixth axis A6. That is, the extension lines of the fifth axis A5, the sixth axis A6, and the seventh axis A7 form a triangular shape. Note that the P-point P is the intersection between the fifth axis A5 and the sixth axis A6.

Thus, instead of the wrist unit WU illustrated in FIG. 1, the wrist unit WU illustrated in FIG. 6B, 6C, or 6D may be used. Provided that the wrist unit WU has a three-axis configuration, a mechanism other than the axis configurations illustrated in FIGS. 6A to 6D may also be used as the wrist unit WU.

Next, a configuration of the painting system 1 will be described with reference to FIG. 7. FIG. 7 is a block diagram illustrating the configuration of the painting system 1. As illustrated in FIG. 7, the painting system 1 includes the transport device 210 and the painting robot 10 in the paint booth 200. Further, the painting system 1 includes a controller 100. Note that the transport device 210 and the painting robot 10 are connected to the controller 100.

First, the painting robot 10 has been described above with reference to FIG. 1 and others, and thus further description will be omitted here. As already described with reference to FIG. 4 and the like, the transport device 210 is a device such as a conveyor belt that transports the workpiece 500 (see FIG. 4) in a predetermined transport direction. Note that the transport device 210 includes a detection device (not illustrated) such as a sensor that detects the position of the workpiece 500 and notifies the controller 100 of a timing at which the workpiece 500 has passed or the like. Further, the transport device 210 transports the workpiece 500 at a constant speed.

The controller 100 includes a control unit 110 and a storage unit 120. The control unit 110 includes a timing acquisition unit 111 and an operation control unit 112. The storage unit 120 stores teaching information 121. Note that, although one controller 100 is illustrated in FIG. 7 for ease of explanation, the transport device 210 and the individual painting robots 10 may be connected to separate controllers 100. Thus, when a plurality of controllers 100 are used, a higher level controller 100 that manages each of the controllers 100 may be provided.

Here, the controller 100 includes a computer including, for example, a central processing unit (CPU), a read only memory (ROM), a random access memory (RAM), a hard disk drive (HDD), input/output ports, and the like, and various circuits.

The CPU of the computer functions as the timing acquisition unit 111 and the operation control unit 112 of the control unit 110 by, for example, reading and executing a program stored in the ROM.

Further, at least one or both of the timing acquisition unit 111 and the operation control unit 112 may be constituted of hardware such as an application specific integrated circuit (ASIC), a field programmable gate array (FPGA) or the like.

The storage unit 120 corresponds to, for example, a RAM or an HDD. The RAM or the HDD can store the teaching information 121. Note that the controller 100 may acquire the above-described program and various kinds of information via another computer or a portable recording medium connected to a wired or wireless network. Further, the controller 100 may be configured as a plurality of devices capable of communicating with one another, or may be configured as a hierarchical device capable of communicating with a higher level device or a lower level device.

The control unit 110 controls the operation of each painting robot 10 while acquiring, from the transport device 210, position information (pulse signals) of a jig such as a base that fixes the workpiece 500 (see FIG. 4) to the movable portion of the transport device 210, or interlock signals for causing each device to operate exclusively. Note that, when a plurality of the controllers 100 is provided, the control unit 110 also executes synchronization processing between the controllers 100.

The timing acquisition unit 111 acquires the position information and the interlock signals described above from the transport device 210. Then, the timing acquisition unit 111 determines the operation timing of each robot in accordance with the acquired position information and interlock signals, and notifies the operation control unit 112 of the determined operation timing. For example, the timing acquisition unit 111 acquires a timing at which the workpiece 500 (see FIG. 4) reaches a predetermined position in the paint booth 200, and instructs the operation control unit 112 to operate each painting robot 10 based on the acquired timing.

The operation control unit 112 operates each painting robot 10 based on the instruction from the timing acquisition unit 111 and the teaching information 121. The operation control unit 112 enhances the motion accuracy of each painting robot 10 by executing feedback control and the like while using an encoder value in an actuator (not illustrated) being the power source of each painting robot 10.

The teaching information 121 is information that is created at a teaching stage of teaching motions to each painting robot 10, and includes a "job" that defines a motion path of each painting robot 10. Note that, in the painting system 1, robots with symmetrical arm configurations are used as described above, with respective robots being disposed at symmetrical positions across the transport device 210 (see FIG. 4). Thus, based on the teaching data of one painting robot 10, it is easy to generate the teaching data of the other painting robot 10.

For example, the teaching data of the painting robot 10R that works on the right side of the workpiece 500 in FIG. 4 can be converted to the teaching data of the painting robot 10L that works on the left side of the workpiece 500 by partial modification or coordinate conversion of the teaching positions included in the teaching data. Thus, according to the painting system 1, the labor and cost of generating the teaching information 121 including the teaching data can be reduced.

Next, the operation procedure of the painting robot 10 in the painting system 1 will be described with reference to FIG. 8. FIG. 8 is a flowchart showing the operation procedure of the painting robot 10. As shown in FIG. 8, when the workpiece 500 (see FIG. 4) approaches from the upstream side, the painting robot 10 (see FIG. 1) approaches the workpiece 500 with the upper arm UA stretched (step S101). Here, "approach" refers to directing the upper arm UA toward the workpiece 500 without interference with the workpiece 500.

Subsequently, when the workpiece 500 approaches further, the painting robot 10 changes orientation to an orientation in which the upper arm UA is folded (step S102). Here, the orientation in which the upper arm UA is folded refers to an orientation in which the second upper arm 14 is bent with respect to the first upper arm 13 so as not to interfere with the door 510 of the workpiece 500. For example, the wrist unit WU can be positioned inside the door 510 by pivoting the second upper arm 14 downward in a state in which the tip end of the first upper arm 13 is above the door 510.

Then, the painting system 1 determines whether it is time to start painting (step S103). In a case where the painting system 1 determines that it is a painting-start timing (step S103: Yes), pivoting about the fourth axis A4 is fixed and the painting work is performed (step S104).

By fixing the fourth axis A4 with the upper arm UA folded, it is possible to avoid accidental interference with the workpiece 500 while increasing the accessibility to the workpiece 500. Note that in a case where the painting system 1 determines in step S103 that it is not the painting-start timing (step S103: No), the processing of step S103 is repeated.

Subsequently, the painting system 1 determines whether the painting work is complete (step S105). In a case where the painting system 1 determines that the painting work is complete (step S105: Yes), the fourth axis A4 is unfixed (step S106), the painting robot 10 is moved away from the workpiece 500 (step S107) and the processing is terminated. Note that in a case where the painting system 1 determines in step S105 that the processing is not complete (step S105: No), the processing of step S105 is repeated.

Note that although FIG. 8 shows a case in which the fourth axis A4 is always fixed during the painting work, the fourth axis A4 may be intentionally operated during the painting work. For example, assume that the upper arm UA is in the folded position and the fourth axis A4 is fixed to start the painting work, and it is difficult to access a distant object in the same orientation during the painting work. In this case, the fourth axis A4 may be unfixed and the fourth axis A4 may be operated in a direction in which the upper arm UA is stretched. In addition, when it is difficult to access the object close by, the fourth axis A4 may be operated in a direction in which the upper arm UA is further folded. That is, even during the painting work, the painting robot 10 may be operated as a seven-axis robot with a redundant axis.

As described above, the painting robot 10 according to the aspect of the embodiment includes the base 10*b*, the swivel base 11, the lower arm 12, the upper arm UA, and the wrist unit WU. The base 10*b* is fixed to the installation surface IS. The swivel base 11 is supported, on the base end side, on the upper surface side of the base 10*b*, and swivels about the first axis A1 along the vertical direction. The lower arm 12 is supported, on the base end side, by the swivel base 11, and pivots about the second axis A2 perpendicular to the first axis A1. The upper arm UA is supported, on the base end side, by the tip end side of the lower arm 12, and pivots about the third axis A3 parallel to the second axis A2.

The wrist unit WU has a three-axis configuration in which the base end side is supported by the tip end side of the upper arm UA and the end effector EE can be attached to the tip end side. The upper arm UA includes the first upper arm 13 on the base end side and the second upper arm 14 on the tip end side. The second upper arm 14 is supported, on the base end side, by the tip end side of the first upper arm 13, the first upper arm 13 being supported by the lower arm 12 on the inner surface, which is the side surface, of the first upper arm 13, and pivots about the fourth axis A4 parallel to the third axis A3. The first upper arm 13 is equipped with the pump PU for the end effector EE on the inner surface side.

Thus, in the painting robot 10, the upper arm UA has the two-arm configuration, and the upper arm UA is provided with the fourth axis A4, which is the redundant axis, whereby the upper arm UA can be bent and stretched. By providing the second upper arm 14 on the inner surface that is the side surface of the first upper arm 13 where the first upper arm 13 is supported by the lower arm 12, the pump PU for the end effector EE is provided in the space created on the inner surface side of the first upper arm 13. Thus, the effective range of motion can be extended to avoid interference with the workpiece. Therefore, the accessibility of the painting robot 10 to the workpiece can be improved. Further, the distance between the pump PU and the end effector EE can be shortened, reducing the loss of paint and improving the paint quality.

The painting system 1 according to the aspect of the embodiment includes the paint booth 200 and the painting robot 10. At least a pair of the painting robots 10 are disposed in the paint booth 200 so as to sandwich the workpiece 500 with respect to the transport direction of the workpiece 500. In the pair of painting robots 10, the axis configurations are symmetrical to each other with respect to the transport center plane P1 along the transport direction, and the respective distances between the first axis A1 and the transport center plane P1 are equal to each other.

By arranging the painting robots 10 with symmetrical axis configurations at equal distances with respect to the transport center plane P1 across the workpiece 500 as described above, the teaching data can be reused, thereby making the teaching work more efficient. The painting robot 10 can be disposed close to the workpiece 500, so that it is possible to contribute to downsizing of the paint booth.

Note that, in the embodiment described above, a case in which the painting robot 10 is the seven-axis robot having one redundant axis is exemplified, but a robot having eight or more axes with a plurality of redundant axes may be used.

Additional effects and modifications can be easily derived by a person skilled in the art. Thus, the broader aspects of the present invention are not limited to the specific details and representative examples illustrated and described above. Accordingly, various modifications may be made without departing from the spirit or scope of the general inventive concept as defined by the appended claims and their equivalents.

REFERENCE SIGNS LIST

1 Painting system
10 Painting robot
10*b* Base
10*c* Auxiliary member
11 Swivel base
12 Lower arm
13 First upper arm
14 Second upper arm
15 Fifth arm
16 Sixth arm
17 Seventh arm
18 Linear body
18*a* Branch linear body
18*d* Branch portion
19 Support part
100 Controller
110 Control unit
111 Timing acquisition unit
112 Operation control unit
120 Storage unit
121 Teaching information
200 Paint booth
201 Floor
202 Wall
203 Ceiling
210 Transport device
500 Workpiece
510 Door
520 Tailgate
A1 First axis
A2 Second axis
A3 Third axis
A4 Fourth axis
A5 Fifth axis
A6 Sixth axis
A7 Seventh axis
AP Pump shaft
CA Rotary actuator
CV Cover
EE End effector
EL Electro-pneumatic device
IS Installation surface
P P-point
PU Pump
UA Upper arm
WU Wrist unit
P1 Transport center plane

What is claimed is:

1. A painting robot comprising:
a base fixed to an installation surface;
a swivel base supported by the base and configured to swivel about a first axis along a vertical direction of the painting robot;
a lower arm supported by the swivel base and configured to pivot about a second axis perpendicular to the first axis;
an upper arm supported by the lower arm and configured to pivot about a third axis parallel to the second axis; and
a wrist unit having a three-axis configuration and supported by the upper arm, wherein
a first swivel base end of the swivel base is supported on an upper surface of the base,
a first lower arm end of the lower arm is supported by a second swivel base end of the swivel base,
a first upper arm end of the upper arm is supported by a second lower arm end of the lower arm opposite to the first lower arm end,
a first wrist unit end of the wrist unit is supported by a second upper arm end of the upper arm opposite to the first upper arm end,
a second wrist unit end of the wrist unit opposite to the first wrist unit end is configured to receive an end effector,
the upper arm includes:
a first upper arm, wherein a first side surface of the first upper arm is supported by the lower arm at the first upper arm end; and
a second upper arm, wherein an end of the second upper arm opposite to the second upper arm end is supported by the first side surface of the first upper arm at an end of the first upper arm opposite to the first upper arm end such that the second upper arm pivots about a fourth axis parallel to the third axis, and
the first upper arm includes a pump for the end effector on the first side surface.

2. The painting robot according to claim 1, wherein
the pump includes:
a pump mechanism disposed outside the first upper arm; and
a rotary actuator disposed inside the first upper arm and configured to drive the pump mechanism, and
the rotary actuator includes a pump shaft corresponding to a drive shaft and oriented along the fourth axis.

3. The painting robot according to claim 2, wherein the first upper arm further includes an electro-pneumatic device for the end effector disposed on the first side surface and aligned with the pump.

4. The painting robot according to claim 1, further comprising:
support parts configured to support a linear body routed outside the robot toward the end effector, wherein
at least one of the support parts:
is disposed on a second side surface of the first upper arm opposite to the first side surface, and
supports the linear body along an extension direction of the first upper arm.

5. The painting robot according to claim 4, wherein
the linear body includes a pair of branch linear bodies branching from the second side surface, and
each of the pair of branch linear bodies is connected to the pump along a surface connecting the second side surface and the first side surface.

6. The painting robot according to claim 5, wherein one of the support parts is disposed a portion where the pair of branch linear bodies branch from the linear body.

7. The painting robot according to claim 4, wherein the support parts includes a protruding support part:

disposed on the second upper arm at a joint portion connecting the first upper arm and the second upper arm, and configured to support the linear body at a position protruding toward a first upper arm side along the fourth axis.

8. The painting robot according to claim 7, wherein at least one of the support parts:

is disposed on an surface of the second upper arm, and supports the linear body supported by the protruding support part and directed toward the end effector along an extension direction of the second upper arm.

9. A painting system comprising:

a paint booth; and a pair of painting robots each of which is the painting robot according to claim 1, wherein the pair of painting robots are disposed in the paint booth to sandwich a workpiece with respect to a transport direction of the workpiece, and in the pair of painting robots;

axis configurations are symmetrical to each other with respect to a transport center plane along the transport direction, and respective distances between the first axis and the transport center plane are equal to each other.

* * * * *